US010448582B2

(12) United States Patent
Jagyasi et al.

(10) Patent No.: US 10,448,582 B2
(45) Date of Patent: Oct. 22, 2019

(54) METHOD AND SYSTEM FOR AGRICULTURE FIELD CLUSTERING AND ECOLOGICAL FORECASTING

(71) Applicant: Tata Consultancy Services Limited, Mumbai (IN)

(72) Inventors: Bhushan Jagyasi, Thane (IN); Sandika Biswas, Thane (IN); Jayantrao Mohite, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 342 days.

(21) Appl. No.: 15/213,831

(22) Filed: Jul. 19, 2016

(65) Prior Publication Data
US 2017/0223900 A1  Aug. 10, 2017

(30) Foreign Application Priority Data
Feb. 9, 2016 (IN) .............................. 201621004643

(51) Int. Cl.
*A01G 22/00* (2018.01)
*G06N 5/04* (2006.01)
*A01G 7/00* (2006.01)

(52) U.S. Cl.
CPC .............. *A01G 22/00* (2018.02); *A01G 7/00* (2013.01); *G06N 5/04* (2013.01)

(58) Field of Classification Search
CPC . A01G 22/00; A01G 7/00; G06N 5/04; G06N 5/02
See application file for complete search history.

(56) References Cited

U.S. PATENT DOCUMENTS

| 5,130,925 A * | 7/1992 | Janes ...................... A01G 7/00 47/17 |
| 6,792,399 B1 | 9/2004 | Phillips et al. |

(Continued)

OTHER PUBLICATIONS

Basso, B. et al., "Review of Crop Yield Forecasting Methods and Early Warning Systems", Department of Geological Sciences Michigan State University, USA, pp. 1-56, (2013).

(Continued)

*Primary Examiner* — Harry W Byrne
*Assistant Examiner* — Sultana Begum
(74) *Attorney, Agent, or Firm* — Finnegan, Henderson, Farabow, Garrett & Dunner LLP

(57) ABSTRACT

A method and system is provided for agriculture field clustering and ecological forecasting. The present application provides a method and system for agriculture field clustering and ecological forecasting based on the clustered agriculture fields, comprises capturing an absolute ground data representing a plurality of field measurements of the agriculture fields; capturing a plurality of weather conditions of the agriculture fields; generating a feature set comprising of said absolute ground data and weather data of the agriculture fields; adaptively clustering the plurality of agriculture fields based on the feature set to generate a cluster; generating a generic forecasting model for ecological forecasting comprising of common features of the feature set in said cluster; selecting at least one feature out of the feature set for generating a plurality of adaptive forecasting model based for ecological forecasting and recommending control measures to a user.

10 Claims, 3 Drawing Sheets

(56) References Cited

U.S. PATENT DOCUMENTS

| | | | | |
|---|---|---|---|---|
| 8,620,510 | B1* | 12/2013 | Meuth | G06Q 10/063 |
| | | | | 701/26 |
| 9,058,633 | B2 | 6/2015 | Lindores et al. | |
| 2002/0016676 | A1* | 2/2002 | Sann | G06Q 10/06 |
| | | | | 702/3 |
| 2017/0228475 | A1* | 8/2017 | Aldor-Noiman | G06K 9/00 |
| 2018/0132422 | A1* | 5/2018 | Hassanzadeh | A01G 22/00 |

OTHER PUBLICATIONS

Rajak, D. et al., "Spatial Temporal Sowing Pattern of Rapeseed-Mustard Crop in India Using Multi-Date Irs Awifs Data", International Archives of the Photogrammetry, Remote Sensing and Spatial Information Sciences, vol. XXXVIII-8/W20, Workshop 8, pp. 56-60, Nov. 2011.

* cited by examiner

METHOD AND SYSTEM FOR AGRICULTURE FIELD CLUSTERING AND ECOLOGICAL FORECASTING

PRIORITY CLAIM

This U.S. patent application claims priority under 35 U.S.C. § 119 to: India Application No. 201621004643, filed on Feb. 9, 2016. The entire contents of the aforementioned application are incorporated herein by reference.

TECHNICAL FIELD

The present application generally relates to agriculture field clustering and ecological forecasting. Particularly, the application provides a method and system for agriculture field clustering and ecological forecasting based on the clustered agriculture fields.

BACKGROUND

Many researchers have worked on ecological forecasting models in agricultural domain for the applications such as forecasting of pest or disease infestation, yield prediction, prediction of harvesting time, prediction of growth of plants etc. Recently some researchers have proposed data assimilation techniques in agriculture to improve the estimates of the model parameters for optimization of deviation between observed and model outcome. But mostly remote sensing data are integrated to improve the model simulation. But lots of heterogeneity is involved from field to field which cannot be overcome by just considering the weather or remote sensing data. There is need to integrate information at various scales like field, village, watershed, regional which covers field level heterogeneity in terms of region as well as the framework can be easily be adopted to the various crops.

Mostly the available forecasting models are specific for a region with a particular geographical boundary of applicability. The existing models do not consider the field specific activities (like irrigation type, chemical usage, different other farm operations etc) and field specific weather parameters (like soil characteristics, humidity at field level), which may result in an impact on the forecast model. So, field specific models are needed for the ecological forecasting.

Prior art does not focuses on the effect of farm operations followed during the growth season of the crop while developing the forecasting model.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method for agriculture field clustering and ecological forecasting based on the clustered agriculture fields, said method comprising processor implemented steps of agriculture field clustering and ecological forecasting, the method starts by capturing an absolute ground data representing a plurality of field measurements of a plurality of agriculture fields using a rural participatory sensing module (208); capturing a plurality of weather conditions of the plurality of agriculture fields using an on-farm sensing module (210); generating a feature set comprising of said absolute ground data and weather data of the plurality of agriculture fields using a feature set generation module (212); adaptively clustering the plurality of agriculture fields based on the feature set to generate a cluster; wherein at least one feature out of the feature set is present in each agriculture field of the cluster using clustering module (214); generating a generic forecasting model for ecological forecasting comprising of common features of the feature set in said cluster using a generic forecasting generation module (216); selecting at least one feature out of the feature set for generating a plurality of adaptive forecasting model based for ecological forecasting on the selected feature out of the feature set using an adaptive forecasting generation module (218); and recommending a plurality of control measures to a user based on said generated adaptive forecasting model using a recommendation generation module (220).

The present application provides a system (200) for agriculture field clustering and ecological forecasting based on the clustered agriculture fields; said system (200) comprising a processor; a data bus coupled to said processor; and a computer-usable medium embodying computer code, said computer-usable medium being coupled to said data bus, said computer program code comprising instructions executable by said processor and configured for executing a rural participatory sensing module (208) configured for capturing an absolute ground data representing a plurality of field measurements of a plurality of agriculture fields; an on-farm sensing module (210) configured for capturing a plurality of weather conditions of the plurality of agriculture fields; feature set generation module (212) configured for generating a feature set comprising of said absolute ground data and weather data of the plurality of agriculture fields; a clustering module (214) configured for adaptively clustering the plurality of agriculture fields based on the feature set to generate a cluster; wherein at least one feature out of the feature set must be common in each agriculture field of the cluster, a generic forecasting generation module (216) configured for generating a generic forecasting model for ecological forecasting comprising of common features of the feature set in said cluster set, an adaptive forecasting generation module (218) configured for selecting at least one feature out of the feature set for generating a plurality of adaptive forecasting model based for ecological forecasting on the selected feature out of the feature set; and a recommendation generation module (220) configured for recommending a plurality of control measures to a user based on said generated adaptive forecasting model.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DETAILED DESCRIPTION OF THE INVENTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present application provides a computer implemented method and system for an agriculture field clustering and ecological forecasting based on the clustered agriculture fields.

Figure 1:
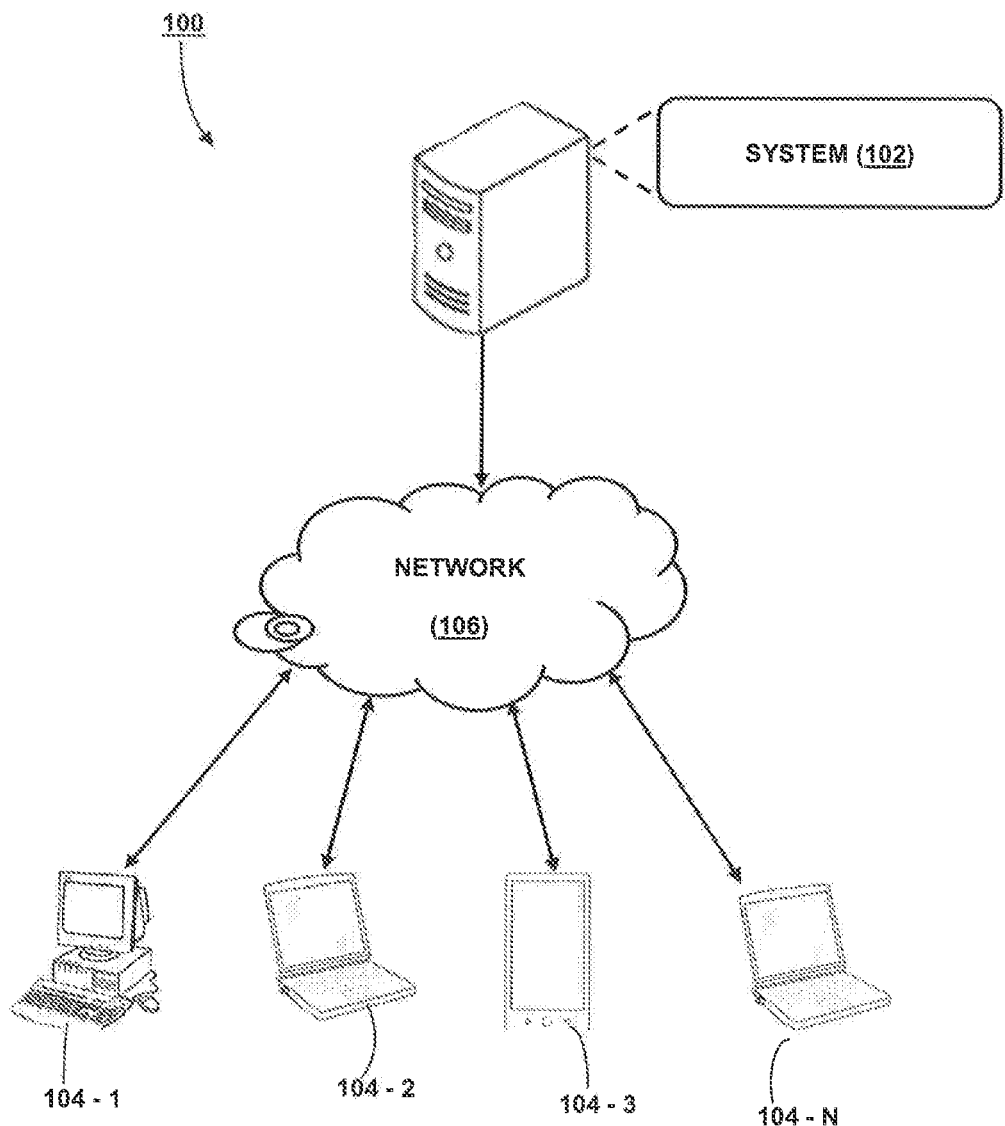
FIG. 1 illustrates a network environment implementing an agriculture field clustering and ecological forecasting based on the clustered agriculture fields, according to an embodiment of the present subject matter.

FIG. 1 illustrates a network environment 100 implementing an agriculture field clustering and ecological forecasting based on the clustered agriculture fields system 102 for an agriculture field clustering and ecological forecasting, according to an example of the present subject matter. The system 102 may be implemented as, but is not limited to, desktop computers, hand-held devices, laptops, or other portable computers, tablet computers, and the like. The network environment 100, apart from the agriculture field clustering and ecological forecasting based on the clustered agriculture fields system 102, includes one or more computing devices 104-1, 104-2 . . . 104-N. For the purpose of explanation and clarity, the computing devices 104-1, 104-2 . . . 104-N, are hereinafter collectively referred to as computing devices 104 and hereinafter individually referred to computing device 104. In the network environment 100, the agriculture field clustering and ecological forecasting based on the clustered agriculture fields system 102 is connected to the computing devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, and storage devices.

Although the agriculture field clustering and ecological forecasting based on the clustered agriculture fields system 102 and the computing devices 104 are shown to be connected through a network 106, it would be appreciated by those skilled in the art that the system 102 and the computing devices 104 may be distributed locally or across one or more geographic locations and can be physically or logically connected to each other.

In an implementation, the agriculture field clustering and ecological forecasting based on the clustered agriculture fields system 102 may be coupled to a database 108. Although not shown in the figure, it will be understood that the database 222 may also be connected to the network 106 or any other network in the network environment 100. In an implementation, the database 222 may include one or more datasets that may be used by the agriculture field clustering and ecological forecasting based on the clustered agriculture fields system 102. In an implementation, the database 222 may be provided as a relational database and may store data in various formats, such as relational tables, object oriented relational tables, indexed tables. However, it will be understood that the database 222 may be provided as other types of databases, such as operational databases, analytical databases, hierarchical databases, and distributed or network databases.

The agriculture field clustering and ecological forecasting based on the clustered agriculture fields system 102 may be coupled to the computing devices 104 for various purposes. For example, the agriculture field clustering and ecological forecasting based on the clustered agriculture fields system 102 may be connected to a computing device 104 to provide access to an information repository, such as the EDR, pertaining to an enterprise. The implementation and functioning of the agriculture field clustering and ecological forecasting based on the clustered agriculture fields system 102 to cluster the fields is as described below.

In one implementation, the agriculture field clustering and ecological forecasting based on the clustered agriculture fields system 102 includes one or more processor(s) 202, interface(s) 204, and a memory 206, coupled to the processor(s) 202. The processor(s) 202 can be a single processing unit or a number of units, all of which could include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 206.

The interface(s) 204 may include a variety of software and hardware interfaces, for example, interfaces for peripheral device(s), such as a keyboard, a mouse, an external memory, and a printer. The interface(s) 204 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 204 may include one or more ports for connecting the data interpretation system 102 to a number of computing devices 104. In various example implementations discussed below, the data interpretation system 102 communicates with the computing devices 104 via the interfaces 204.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The data interpretation system 102 also includes modules and data 222.

The modules, amongst other things, include routines, programs, objects, components, data structures, etc., which perform particular tasks or implement particular abstract data types. The modules, includes a rural participatory sensing module (208), an on-farm sensing module (210), a feature set generation module (212), a clustering module (214), a generic forecasting generation module (216), an adaptive forecasting generation module (218), a recommendation generation module (220) and other module(s). The other module(s) may include programs or coded instructions that supplement applications and functions of the agriculture field clustering and ecological forecasting based on the clustered agriculture fields system 102.

Figure 2:
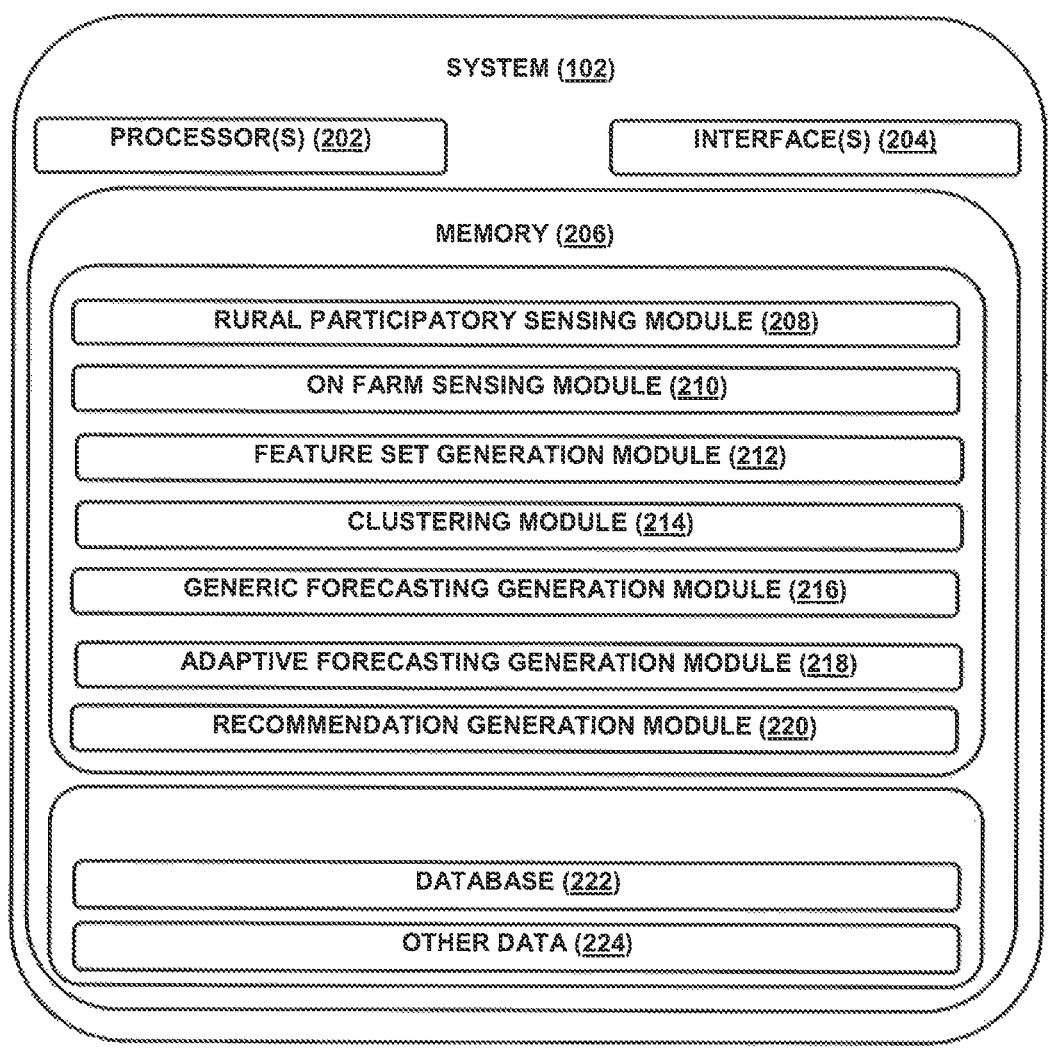
FIG. 2: shows a block diagram illustrating system architecture of an agriculture field clustering and ecological forecasting based on the clustered agriculture fields, according to an embodiment of the present subject matter.

Referring to FIG. 2 is a block diagram illustrating system architecture implementing an agriculture field clustering and ecological forecasting based on the clustered agriculture fields.

In an embodiment of the present invention, a system (102) is provided for an agriculture field clustering and ecological forecasting based on the clustered agriculture fields. The system (102) comprises of a rural participatory sensing module (208), an on-farm sensing module (210), a feature set generation module (212), a clustering module (214), a generic forecasting generation module (216), an adaptive forecasting generation module (218), a recommendation generation module (220) and other module(s).

In an embodiment of the present invention, the system (102) may be used for agriculture field clustering and ecological forecasting based on the clustered agriculture fields. In order to cluster the fields and provides the ecological forecast, the system (102) at first captures an absolute ground data representing a plurality of field measurements of a plurality of agriculture fields. Specifically, in the present implementation, the absolute ground data representing a plurality of field measurements of a plurality of agriculture fields is captured using a rural participatory sensing module (208).

In another embodiment of the present invention, an on-farm sensing module (210) is adapted for capturing a plurality of weather conditions of the plurality of agriculture fields. The on farm sensing can be a sensor interfaced with hand held device having sensing, processing, communicating and storage capability. The sensors can also be mounted on wireless sensor network or weather station and can be placed on the farm to monitor local meteorological and soil parameters.

In another embodiment of the present invention, a feature set generation module (212) is adapted for generating a feature set comprising of said absolute ground data and weather data of the plurality of agriculture fields. The feature set is selected from a group comprising but not limiting to crop variety, meteorological parameters, and vegetation indices, field specific activities, soil parameters, morphological parameters of watershed, crop contextual data, climatic parameters and a combination thereof.

In another embodiment of the present invention, a clustering module (214) is adapted for adaptively clustering the plurality of agriculture fields based on the feature set to generate a cluster; wherein at least one feature out of the feature set must be common in each agriculture field of the cluster. The feature set is selected from a group comprising but not limiting to crop variety, meteorological parameters, and vegetation indices, field specific activities, soil parameters, morphological parameters of watershed, crop contextual data, climatic parameters and a combination thereof.

In another embodiment of the present invention, a generic forecasting generation module (216) is adapted for generating a generic forecasting model for ecological forecasting comprising of common features of the feature set in said cluster set. The forecasting is based on the selection of feature from the feature set that is common for the cluster. The generic model for each cluster and multiple models within each cluster is configured to be adaptively modified based on the actual observations.

In another embodiment of the present invention, an adaptive forecasting generation module (218) is adapted for selecting at least one feature out of the feature set for generating a plurality of adaptive forecasting model based for ecological forecasting on the selected feature out of the feature set. The architecture of the system. $C=\{C1, C2, \ldots Cj, \ldots Ck\}$ is set of clusters, Where each cluster consists of different fields. The fields may or may not belong to same agro-climatic zones. Each cluster will have number of models. So, for a particular field a model can be used which may be beyond the geographical boundary which this field actually belongs to. When a set of fields are available, cluster formation will be done based on region specific or field specific parameters. After cluster formation for each cluster $Ci$ there will be a set of models $Mi=\{Mi1, Mi2, \ldots Mij, \ldots MiN\}$. For each cluster multiple number of models can be generated based on combination of available features from each field within the cluster. After cluster formation and model generation, model and cluster will be adapted with uncertainty in field parameters over time and also based on new set of features from an unknown field. Cluster selection for the unknown field will be decided based on the parameters/features available for the field and the model for the selected cluster can be used for that unknown field.

In another embodiment of the present invention, a recommendation generation module (220) is adapted for recommending a plurality of control measures to a user based on said generated adaptive forecasting model. The recommendation can be selected from a group comprising but not limiting to specific parameters like pest or disease incidence (capturing images of affected plants), different activities in field like pesticide application, type pesticide, quantity of pesticide, irrigation, planting, date of sowing and any other activities which is useful for capturing differences in parameters causing spatial and temporal variability in ecological parameters that is being forecast.

In another embodiment of the present invention, a system performs clustering of fields based on the similarity of characteristics defined by different parameters reported through different modes like Wireless sensor networks, Rural Participatory Sensing, Remote Sensing, morphological parameters of watershed, crop contextual data and any other source that can uniquely identify a field. Each field may not have all the parameters (e.g. some fields may have only WSN data or some fields may have only Remote Sensing data or some may have combination of all these parameters), so clustering of fields will be performed based on variable length features (or parameters) but with minimal information which can uniquely characterize a field. This system and method for cluster selection will decide on inclusion of an unknown field in a cluster based on the number of features available and/or collecting the features required through participatory sensing. For each cluster there must be at least one field with all the parameters to compare a given field with reduced set of parameters for decide about its inclusion in the cluster.

In another embodiment of the present invention, a system provides cluster specific adaptive framework which makes the models adaptive over time with the availability of more information from the fields of that cluster. These forecasting models can be adaptively modified starting from a basic model to improve its performance over time, based on actual observations of the predicted outcome reported using participatory sensing and weather parameters sensed through Wireless Sensor Network. The model structure and its state variables varies over different clusters and over time within each of these small regions. Thus, for the given field the available parameters, determination of its association with one or multiple clusters is done.

Figure 3:
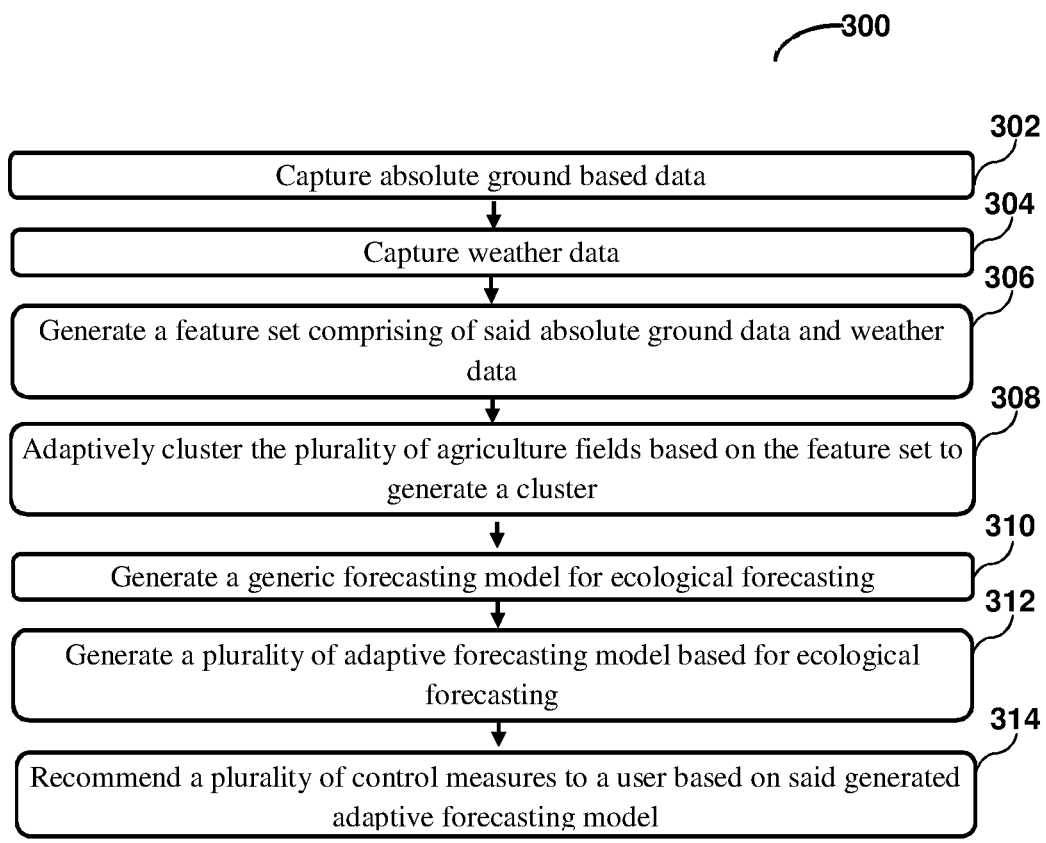
FIG. 3 illustrates a method for an agriculture field clustering and ecological forecasting based on the clustered agriculture fields, according to another embodiment of the present subject matter.

Referring to FIG. 3 is a flow chart illustrating a method for agriculture field clustering and ecological forecasting based on the clustered agriculture fields.

The process starts at step 302 wherein the absolute ground data representing a plurality of field measurements of a plurality of agriculture fields is captured using a rural participatory sensing module (208). At the step 304, the data related to plurality of weather conditions of the plurality of agriculture fields is captured using an on-farm sensing module (210). At the step 306 a feature set comprising of said absolute ground data and weather data of the plurality of agriculture fields is generated using a feature set generation module (212). At the step 308 the plurality of agriculture fields based on the feature set are clustered; wherein at least one feature out of the feature set is present in each agriculture field of the cluster using clustering module (214). At step 310 a generic forecasting model is generated for ecological forecasting which comprises common features of the feature set in said cluster using a generic forecasting generation module (216). At the step 312 at least one feature out of the feature set is selected for generating a plurality of adaptive forecasting model based for ecological forecasting on the selected feature out of the feature set using an adaptive forecasting generation module (218). The process ends at step 314 wherein a recommendation of a plurality of control measures to a user based on said generated adaptive forecasting model are generated using a recommendation generation module (220).

In view of the foregoing, it will be appreciated that the present invention provides a method and system for agriculture field clustering and ecological forecasting based on the clustered agriculture fields. Still, it should be understood that the foregoing relates only to the exemplary embodiments of the present invention, and that numerous changes may be made thereto without departing from the spirit and scope of the invention as defined by the following claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for agriculture field clustering and ecological forecasting based on the clustered agriculture fields, said method comprising processor implemented steps of:
   a. capturing an absolute ground data representing a plurality of field measurements of a plurality of agriculture fields using a rural participatory sensing module (208);
   b. capturing a plurality of weather conditions of the plurality of agriculture fields using an on-farm sensing module (210);
   c. generating a feature set comprising field specific features of said absolute ground data and weather data of the plurality of agriculture fields using a feature set generation module (212);
   d. adaptively clustering, by a clustering module (214), the plurality of agriculture fields based on the feature set to generate a cluster; wherein at least one feature out of the feature set is common in each agriculture field of the cluster; wherein each cluster consists of a plurality of agricultural fields belonging to same or different agro-climatic zones;
   e. generating a generic forecasting model for ecological forecasting comprising of common features of the feature set in said cluster using a generic forecasting generation module (216);
   f. selecting at least one feature out of the feature set for generating a plurality of adaptive forecasting model for ecological forecasting, for each cluster, based on the selected feature using an adaptive forecasting generation module (218); wherein the plurality of adaptive forecasting model is configured to be adaptively modified based at least on inclusion of a new agriculture field, or on availability of more information on the features; wherein inclusion of the new agricultural field in a particular cluster is carried out when all available features of the new agricultural field, captured through the rural participatory sensing module (208) and on-farm sensing module (210), are common with the features of the particular cluster; and g. recommending a plurality of control measures to a user based on said generated adaptive forecasting model using a recommendation generation module (220).

2. The method as claimed in claim 1, wherein the absolute ground data and the weather condition data is stored with a plurality of other farming data in a database (222).

3. The method as claimed in claim 2, wherein the absolute ground data further comprises of actual on field observation and incidents.

4. The method as claimed in claim 1, wherein all models including the generic model for each cluster and multiple models within each cluster will be adapted with actual on field observations of a predicted outcome reported using the absolute ground data obtained from rural participatory sensing module (208) and the weather conditions obtained from on-farm sensing module (210).

5. The method as claimed in claim 1, wherein the feature set is selected from a group comprising but not limiting to crop variety, meteorological parameters, vegetation indices, field specific activities, soil parameters, morphological parameters of watershed, crop contextual data, climatic parameters and a combination thereof.

6. A system for agriculture field clustering and adaptive ecological forecasting, said system comprising:
   a processor;
   a data bus coupled to said processor; and
   a computer-usable medium embodying computer code, said computer-usable medium being coupled to said data bus, said computer program code comprising instructions executable by said processor and configured for executing:
   a. a rural participatory sensing module (208) configured for capturing an absolute ground data representing a plurality of field measurements of a plurality of agriculture fields;
   b. an on-farm sensing module (210) configured for capturing a plurality of weather conditions of the plurality of agriculture fields;
   c. feature set generation module (212) configured for generating a feature set comprising field specific features of said absolute ground data and weather data of the plurality of agriculture fields;
   d. a clustering module (214) configured for adaptively clustering the plurality of agriculture fields based on the feature set to generate a cluster; wherein at least one feature out of the feature set is common in each agriculture field of the cluster; wherein each cluster consists of a plurality of agricultural fields belonging to same or different agro-climatic zones;
   e. generic forecasting generation module (216) configured for generating a generic forecasting model for ecological forecasting comprising of common features of the feature set in said cluster set;
   f. adaptive forecasting generation module (218) configured for selecting at least one feature out of the feature set for generating a plurality of adaptive forecasting model for ecological forecasting, for each cluster, based on the selected feature out of the feature set; wherein inclusion of the new agricultural field in a particular cluster is carried out when all available features of the new agricultural field, captured through the rural participatory sensing module (208) and on-farm sensing module (210), are common with the features of the particular cluster; and
   g. a recommendation generation module (220) configured for recommending a plurality of control measures to a user based on said generated adaptive forecasting model.

7. The system as claimed in claim 6, wherein the adaptive forecasting model is configured to be adaptively modified based on inclusion of new fields.

8. The system as claimed in claim 6, wherein the generic model for each cluster and multiple models within each cluster is configured to be adaptively modified based on the actual observations.

9. The system as claimed in claim 6, wherein a repository is configured to store the absolute ground data with a plurality of other farming data (224).

10. A non-transitory computer readable medium comprising program codes executable by at least one processor for a method for agriculture field clustering and ecological forecasting based on the clustered agriculture fields; the program codes comprising:
   a. a program code for capturing an absolute ground data representing a plurality of field measurements of a plurality of agriculture fields using a rural participatory sensing module (208);
   b. a program code for capturing a plurality of weather conditions of the plurality of agriculture fields using an on-farm sensing module (210);
   c. a program code for generating a feature set comprising field specific features of said absolute ground data and weather data of the plurality of agriculture fields using a feature set generation module (212);
   d. a program code for adaptively, by a clustering module (214), the plurality of agriculture fields based on the feature set to generate a cluster; wherein at least one feature out of the feature set is common in each agriculture field of the cluster; wherein each cluster consists of a plurality of agricultural fields belonging to same or different agro-climatic zones;
   e. a program code for generating a generic forecasting model for ecological forecasting comprising of common features of the feature set in said cluster using a generic forecasting generation module (216);
   f. a program code for selecting at least one feature out of the feature set for generating a plurality of adaptive forecasting model for ecological forecasting, for each cluster, based on the selected feature using an adaptive forecasting generation module (218); wherein the plurality of adaptive forecasting model is configured to be adaptively modified based at least on inclusion of a new agriculture field, or on availability of more information on the features; wherein inclusion of the new agricultural field in a particular cluster is carried out when all available features of the new agricultural field, captured through the rural participatory sensing module (208) and on-farm sensing module (210), are common with the features of the particular cluster; and
   g. a program code for recommending a plurality of control measures to a user based on said generated adaptive forecasting model using a recommendation generation module (220).

* * * * *